(12) United States Patent
Lail et al.

(10) Patent No.: US 9,707,510 B2
(45) Date of Patent: Jul. 18, 2017

(54) REGENERABLE SOLVENT MIXTURES FOR ACID-GAS SEPARATION

(75) Inventors: Marty Lail, Raleigh, NC (US); Luke Coleman, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 13/820,027

(22) PCT Filed: Sep. 3, 2011

(86) PCT No.: PCT/US2011/050452
§ 371 (c)(1),
(2), (4) Date: Feb. 28, 2013

(87) PCT Pub. No.: WO2012/031281
PCT Pub. Date: Mar. 8, 2012

(65) Prior Publication Data
US 2013/0164200 A1 Jun. 27, 2013

Related U.S. Application Data

(60) Provisional application No. 61/379,827, filed on Sep. 3, 2010.

(51) Int. Cl.
*B01D 53/14* (2006.01)
*B01D 53/40* (2006.01)

(52) U.S. Cl.
CPC ......... *B01D 53/40* (2013.01); *B01D 53/1425* (2013.01); *B01D 53/1456* (2013.01); *B01D 53/1493* (2013.01); *B01D 53/1475* (2013.01); *B01D 2252/202* (2013.01); *B01D 2252/20405* (2013.01); *B01D 2252/20421* (2013.01); *B01D 2252/20426* (2013.01); *B01D 2252/504* (2013.01); *B01D 2257/30* (2013.01);
(Continued)

(58) Field of Classification Search
None
See application file for complete search history.

(56) References Cited

U.S. PATENT DOCUMENTS 6,036,931 A 3/2000 Yoshida et al.
7,982,069 B2 7/2011 Jessop et al.
(Continued)

FOREIGN PATENT DOCUMENTS

EP 1582250 10/2005
EP 2 589 424 8/2013
(Continued)

OTHER PUBLICATIONS

Gwinner et al., "CO2 Capture in Flue Gas: Semiempirical Approach to Select a Potential Physical Solvent", Ind. Eng. Chem. Res. 2006, 45, 5044-5049.*
(Continued)

*Primary Examiner* — Anita Nassiri Notlagh
(74) *Attorney, Agent, or Firm* — Womble Carlyle Sandridge & Rice, LLP

(57) ABSTRACT

A solvent system comprising a diluent and a nitrogenous base for the removal of $CO_2$ from mixed gas streams is provided. Also provided is a process for removing $CO_2$ from mixed gas streams using the disclosed solvent system. The solvent system may be utilized within a gas processing system.

10 Claims, 14 Drawing Sheets ionic solution of carbamate salt

(52) U.S. Cl.
CPC .. *B01D 2257/302* (2013.01); *B01D 2257/308* (2013.01); *B01D 2257/404* (2013.01); *B01D 2257/504* (2013.01); *B01D 2258/0283* (2013.01); *Y02C 10/06* (2013.01)

(56) References Cited

U.S. PATENT DOCUMENTS

| | | |
|---|---|---|
| 2006/0226072 A1 | 10/2006 | Wyse et al. |
| 2007/0264180 A1 | 11/2007 | Carrette et al. |
| 2007/0286783 A1 | 12/2007 | Carrette et al. |
| 2009/0099269 A1* | 4/2009 | Rigby et al. ............... 518/705 |
| 2009/0136402 A1 | 5/2009 | Heldebrant et al. |
| 2009/0220397 A1 | 9/2009 | Heldebrant et al. |
| 2009/0291872 A1 | 11/2009 | Bara et al. |
| 2009/0291874 A1 | 11/2009 | Bara et al. |
| 2011/0293498 A1 | 12/2011 | Laharya et al. |

FOREIGN PATENT DOCUMENTS

| | | |
|---|---|---|
| FR | 2 909 010 | 5/2008 |
| FR | 2909010 | 5/2008 |
| JP | 2003-261315 | 9/2003 |
| JP | 2007-39387 | 2/2007 |
| JP | 2007-222847 | 9/2007 |
| JP | 2008-296211 | 12/2008 |
| JP | 2010-015933 | 1/2010 |
| JP | 2011-521778 | 7/2011 |
| WO | WO 98/32520 | 7/1998 |
| WO | WO 2009/143376 | 11/2009 |

OTHER PUBLICATIONS

ChemicalLand21, 2,2,3,3-Tetrafluoro-1-Propanol Product Specification.*
Wikipedia, the free encyclopedia, 1-Hexanol.*
Wikipedia—TMG (https://en.wikipedia.org/wiki/1,1,3,3-Tetramethylguanidine[Sep. 10, 2015 2:37:13 PM]).*
Versteeg et al., "On the Kinetics Between CO2 and Alkanolamines Both in Aqueous and Non-aqueous Solutions—I. Primary and Secondary Amines", Chemical Engineering Science, vol. 43, No. 3, pp. 573-585, 1988.*
Huma Metabolome Database: Showing metabocard for Diethylamine (HMD41878). Created Sep. 13, 2012 and updated Feb. 11, 2016.*
Wang et al. "Carbon Dioxide Capture by Superbase-Derived Protic Ionic Liquids," *Angewandte Chemie International Ediction*, 2010, pp. 5978-5981, vol. 49, No. 34.
San-Apro Limited, DBU Product, 2009.
Heldebrant et al., "CO2-binding Organic Liquids (CO2BOLs) for Post-Combustion CO2 Capture," *Energy Procedia*, 1 (2009) pp. 1187-1195.
Kaupmees et al., "Basicities of strong Bases in Water: A Computational Study," *Croatic Chemica ACTA*, 2014, vol. 87(4), pp. 385-395.
Wang et al., "Reversible and Robust CO2 Capture by Equimolar Task-Specific Ionic Liquid-Superbase Mixtures," *Green Chem.* 2010, vol. 12(5), pp. 870-874.
Kore, "Table of Proton Affinities in Alphabetical Order," *Kore Technology Limited*, 2012.
Julian et al. "The Unusually High Proton Affinity of Aza-18-Crown-6 Ether: Implications for the Molecular Recognition of Lysine in Peptides by Lariat Crown Ethers," *American Society for Mass Sepctrometry 2002*, 13, pp. 493-498.
Vitorino et al, "Thermochemisty of 1,1,3,3-Tetramethylguanidine and 1,1,3,3-Tetramethylguanidinium Nitrate," *J. Chem Thermodynamics*, 2014, pp. 179-189, vol. 77.
Barićet al., "Towards the Strongest Neutral Organic Superbases Based on Intramolecular H-bonds," *Croatica Chemica ACTA*, 2014, Vo. 87, (4), pp. 459-464.
Klöter et al., "Trifluoromethanol ($CF_3OH$) and Trifluoromethylamine ($CF_3NH_2$)," *Journal of the American Chemical Society*, 1979, 101:2, pp. 347-349.
Morris et al., "Reactions of Atmospheric Ions with Selected Hydrofluorocarbons," *J. Phys. Chem.*, 1995, vol. 99, pp. 5992-5999.
Raab et al., "1,8-Bis(tetramethylguanidino)naphthalene (TMGN): A New, Superbasic and Kinetically Active Proton Sponge," *Chem. Eur. J.*, 2002, vol. 8, No. 7, pp. 1682-1693.
Suenram et al. "Fluoromethanol: Synthesis, Microwave Spectrum, and Dipole Moment," *Journal of Molecular Spectroscopy*, 1986, vol. 119, pp. 446-455.

* cited by examiner

REGENERABLE SOLVENT MIXTURES FOR ACID-GAS SEPARATION

FIELD OF THE INVENTION

The present invention relates to solvent systems for the removal of specific components of gas streams, as well as devices and methods using such systems. More specifically, the invention can provide for removal of acid gases, such as $CO_2$, $SO_2$, COS, $CS_2$ and NOx. The invention further can provide for continuous operation of devices and methods using the system. Further, the inventive methods can utilize multiple absorption/desorption means, including gas absorption/desorption and/or phase-enhanced absorption/desorption.

BACKGROUND OF THE INVENTION

Various strategies are being pursued to minimize the production and/or release of undesirable emissions from combustion processes. One such strategy is the development of technologies for the specific removal of acid gases from gas mixtures, such as the exhausts of carbon combustion processes. The separation of acid gases, such as $CO_2$, from gas mixtures has been carried out industrially for over a hundred years, although no known process has been used on a large scale such as that required by large, industrial power plants. Of the numerous processes used for $CO_2$ separation, current technology mainly focuses on the use of various solvents, such as alkali carbonates in the BENFIELD™ Process (UOP, LLC), alcoholamines in the ECONAMINE FG PLUS™ process (Fluor Corporation), and alcohols, diols, and ethers in the RECTISOL® process (Lurgi, GMBH) and the SELEXOL™ solvent (The Dow Chemical Company). In a typical solvent-based process, the gas mixture to be treated is passed through a liquid solvent that interacts with acidic compounds in the gas stream (e.g., $CO_2$ and $SO_2$) and separates them from non-acidic components. The liquid becomes rich in the acid-gas components, which are then removed under a different set of operating conditions so that the solvent can be recycled for additional acid-gas removal.

Methods for removal of the acid-gas components from rich solvents involve pressure and temperature change. Depending on the temperature of the gas mixture and the partial pressure of the acid-gas in the mixture, certain solvents are preferred for specific applications. When a solvent operates to interact with an acid-gas by chemical absorption, an exothermic chemical reaction occurs. The reversal of this reaction requires at least the amount of energy to be added back to the rich solvent that was produced by the forward reaction, not to mention the energy needed to bring the rich solvent to the temperature where reversal is appreciable and to maintain conditions to complete the reverse reaction to an appreciable extent. The energy required to obtain purified acid-gas from the rich solvent contributes to the cost of the purified product. In particular, the cost of the purified acid-gas has become a significant hurdle for the application of solvent technologies to fossil-fuel fired power plants for the removal of acid gases from flue gas.

Non-aqueous solvents have been used to remove $CO_2$ from natural gas streams and require less energy for regeneration. Single-component alcoholic physisorption solvents such as RECTISOL™ and SELEXOL® are commercially available for $CO_2$ separation but perform poorly in the humid, near-ambient pressure conditions associated with flue gas. Alcoholamines and amines have been combined with alcohols, diols, and cyclic carbonates by various researches to form "hybrid solvents" whose reaction mechanisms and kinetics have been studied in the literature. See, Alvarez-Fuster, et al., *Chem. Eng. Sci.* 1981, 36, 1513; Ali, et al., *Separation and Purification Technology* 2000, 18, 163; Usubharatana, et al., *Energy Procedia* 2009, 1, 95; and Park, et al., *Sep. Sci. Technol.* 2005, 40, 1885. In addition, a process known as the "phase-transitional absorption method" has been disclosed in relation to methods for deacidizing gaseous mixtures, which generally consists of the absorption of acid gases into an "absorbing phase" of less density than water consisting of a nitrogenous base and an alcohol, followed by transfer of the absorbed acid gas into an aqueous "carrier phase". The aqueous carrier phase can be regenerated in a regenerator. The process claims to save energy by absorbing an acid gas at a faster rate than in an absorbing phase alone, and by avoiding the energy required to pump a rich absorbing phase to a separate regenerator by utilizing gravity to transfer the acid gas between phases in a single column for absorption and regeneration.

Ionic liquids are another non-aqueous solvent currently being developed. These solutions consist completely of ion pairs which are in the liquid state near room temperature. They have low regeneration requirements but have not surpassed aqueous amine solvents in performance due to factors including $CO_2$ loading capacity, viscosity, cost, and, importantly, degradation by water. Using a non-aqueous liquid solvent to separate $CO_2$ from gas mixtures containing water vapor can lead to the accumulation of $H_2O$ in the liquid solution either as a single-phase or bi-phase solution, depending upon the process conditions (e.g., pressure, temperature, $H_2O$ concentration) and the affinity of the non-aqueous solvent for $H_2O$. $H_2O$ accumulation is detrimental to the $CO_2$ separation and purification process, since more energy will be required for solvent regeneration due to the necessity of continually removing water from the solvent.

Another group of non-aqueous liquids which could be developed to address many of the problems affecting $CO_2$ solvents are room temperature switchable ionic liquids. These equimolar mixtures of amidine or guanidine nitrogen bases and alcohols are non-ionic room temperature liquids that react with $CO_2$ to form room-temperature ionic liquids. Typically, the conductivity of equimolar mixtures increases by one or two orders of magnitude when $CO_2$ is added. Importantly, these solvents have higher $CO_2$ loadings than some aqueous amines, and are regenerable under milder conditions. While these solvents are a promising alternative technology, those that have been previously disclosed are poorly suited for flue gas applications due to their chemistries with respect to water, which typically is a major component of flue gas. $CO_2$ is captured via the formation of amidinium and guanidinium alkyl carbonate salts derived from the conjugate bases of the deprotonated alcohol components. However, if the conjugate base of the alcohol is a weaker acid than water, an acid-base equilibrium is established between the alcohol-conjugate base and water, which favors deprotonation of water and reformation of the protonated alcohol. The conjugate base of water, the hydroxide ion, reacts favorably with $CO_2$ to form a bicarbonate anion, which requires more energy to reverse than alkyl carbonate anions.

Accordingly, it would be beneficial to formulate a new solvent system capable of effectively removing acid gases from gas streams (particularly water-containing gas streams)

and which can be regenerated at a lower temperature and energy load than the solvents currently utilized for such purposes.

SUMMARY OF THE INVENTION

In one aspect, the present invention relates to a solvent system for the removal of acidic gases, such as $CO_2$, from a gas stream. In some embodiments, the solvent system comprises a nitrogenous base and one or more diluents. In some embodiments, a solvent system according to the invention can comprise a nitrogenous base and an acidic component that acts as a diluent.

In one embodiment, the invention provides a solvent system comprising a solution formed of: a nitrogenous base having a hydrogen atom leaving group (preferably having a nitrogen with a hydrogen atom leaving group); and a diluent, wherein the nitrogenous base has a structure such that it reacts with an acidic gas so as to form a carbamate salt or a heteroatom analogue of a carbamate salt without any substantial formation of a carbonate ester or a heteroatom analogue of a carbonate ester.

The nitrogenous base and the diluent can vary. For example, in some embodiments, the diluent is selected from the group consisting of fluorinated alcohols, optionally substituted phenols, nitrogen heterocycles, and mixtures thereof. In some embodiments, the diluent is specifically selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole; and mixtures thereof. In certain embodiments, the diluent is selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof. In some embodiments, the diluent may be selected from the group consisting of fluorinated alcohols, fluorinated ketones, fluorinated aliphatic hydrocarbons, fluorinated aromatic hydrocarbons, fluorinated nitrogen heterocycles, fluorinated oxygen heterocycles, fluorinated aliphatic ethers, fluorinated cyclic ethers, fluorinated esters, and fluorinated amides and mixtures thereof. In certain specific embodiments, the diluent is selected from the group consisting of toluene, p-xylene, 1-methylnaphthalene, 2,4,6-dimethylaminophenol, benzylalcohol, 2,6-dimethylcyclohexanone, 3,5-lutidine, cyclohexanone, aniline, pyridine, 2-fluoroacetylphenone, 1-fluorodecane, 2,4-difluorobenzophenone, 2-fluoro-3-trifluoromethylaniline, 2-fluoroaniline, 4-fluoroaniline, 3-trifluoromethylacetophenone, 2-trifluoromethylacetophenone, bis(2,2,2-trifluoroethyl)methylphosphonate, 4-fluoro-3-(trifluoromethyl)benzaldehyde and mixtures thereof.

In some embodiments, the nitrogenous base has a pKa of about 8 to about 15. In some embodiments, the nitrogenous base is selected from the group consisting of primary amines, secondary amines, diamines, triamines, tetraamines, pentamines, cyclic amines, cyclic diamines, amine oligomers, polyamines, alcoholamines, guanidines, amidines, and mixtures thereof. Certain specific nitrogenous bases include, but are not limited to, 1,4-diazabicyclo-undec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; mono ethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof.

In some embodiments, the solvent system is immiscible with water. For example, in certain embodiments, the solvent system has a solubility with water of less than about 10 g of solvent per 100 mL of water.

In another aspect of the invention is provided a process for the removal of acid gas from a gas stream, comprising contacting an acid gas-containing gas stream with a solvent system comprising a liquid comprising: a nitrogenous base having a hydrogen atom leaving group; and a diluent, wherein the nitrogenous base has a structure such that it reacts with an acidic gas so as to form a carbamate salt or a heteroatom analogue of a carbamate salt without any substantial formation of a carbonate ester or heteroatom analogue of a carbonate ester.

In some embodiments, the process further comprises outputting an acid gas-rich solvent and an acid gas-lean gas stream. In some embodiments, the process further comprises regenerating the acid gas-rich solvent by applying heat to form a regenerated solvent comprising a lower content of acid gas than present in the acid gas-rich solvent. The heat applied by the regeneration component may be, for example, derived from a source selected from the group consisting of low-pressure steam, hot flue gas, or a combination thereof.

DETAILED DESCRIPTION OF THE INVENTION

Figure 1:
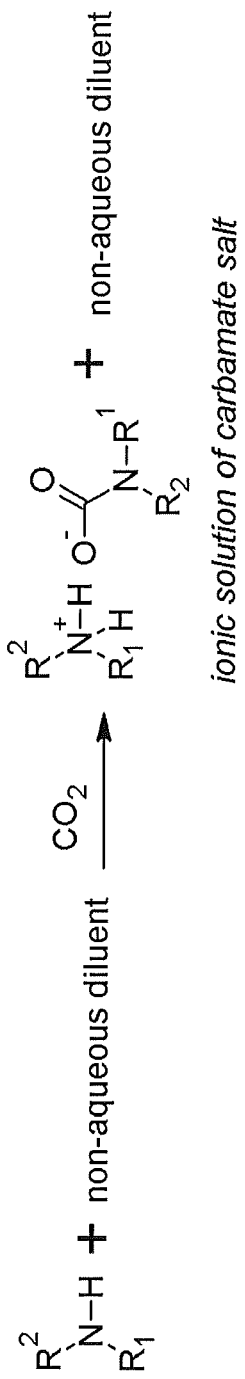
FIG. 1 is a scheme showing a reaction pathway employed for capturing $CO_2$ using solvent mixtures comprising an acid component and a nitrogenous base.
Figure 2:
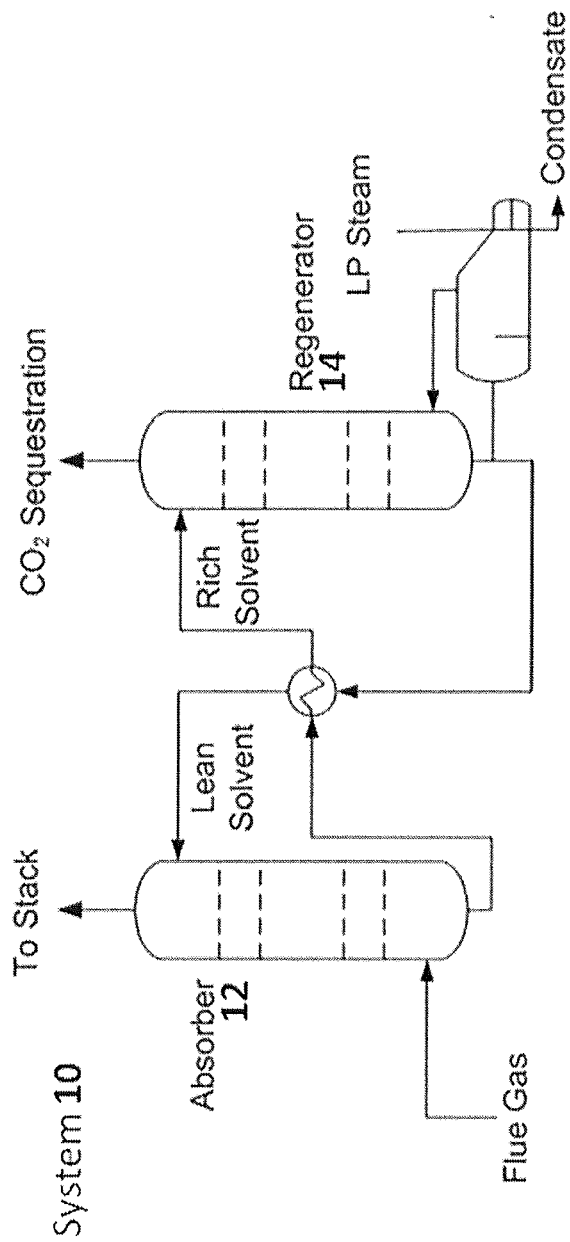
FIG. 2 is a diagram of a reboiler-based system embodied by the present invention for the capture and regeneration of acidic gases from a mixed gas stream.
Figure 3:
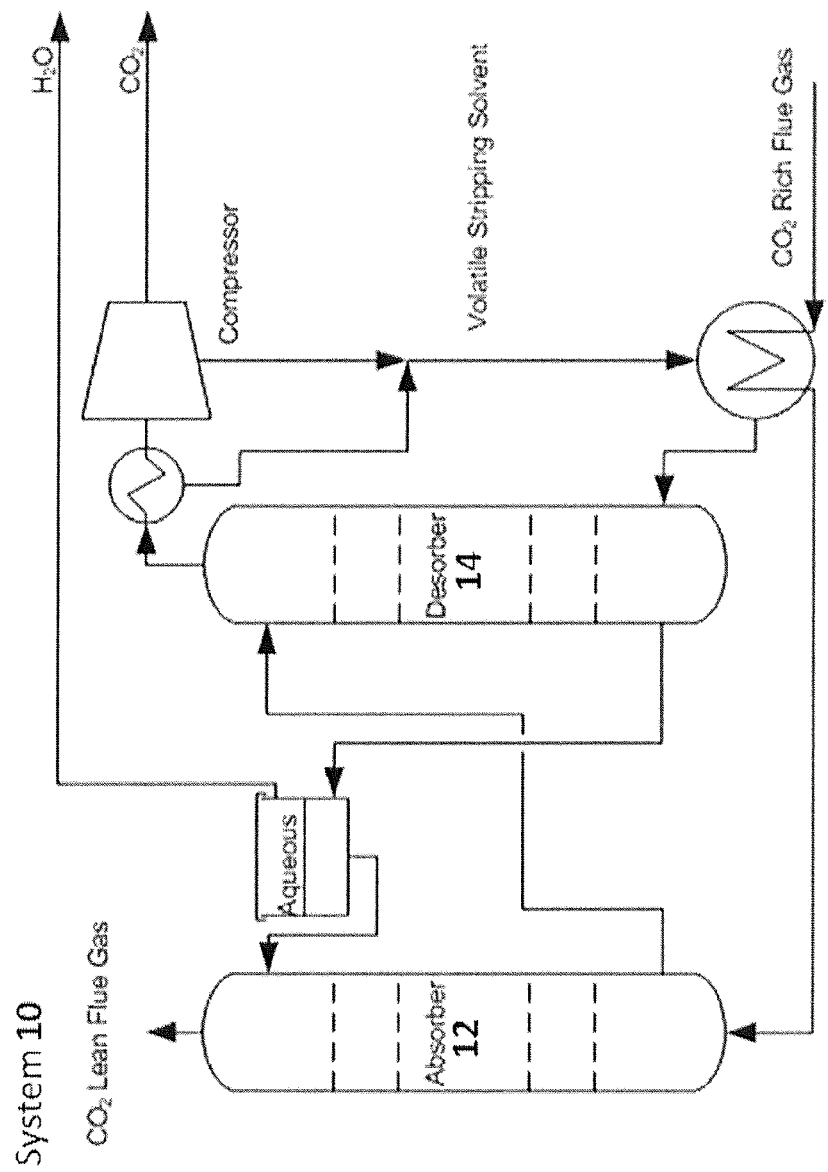
FIG. 3 is a diagram of a reboiler-free system embodied by the present invention for the capture of acidic gases from a mixed gas stream.
Figure 4:
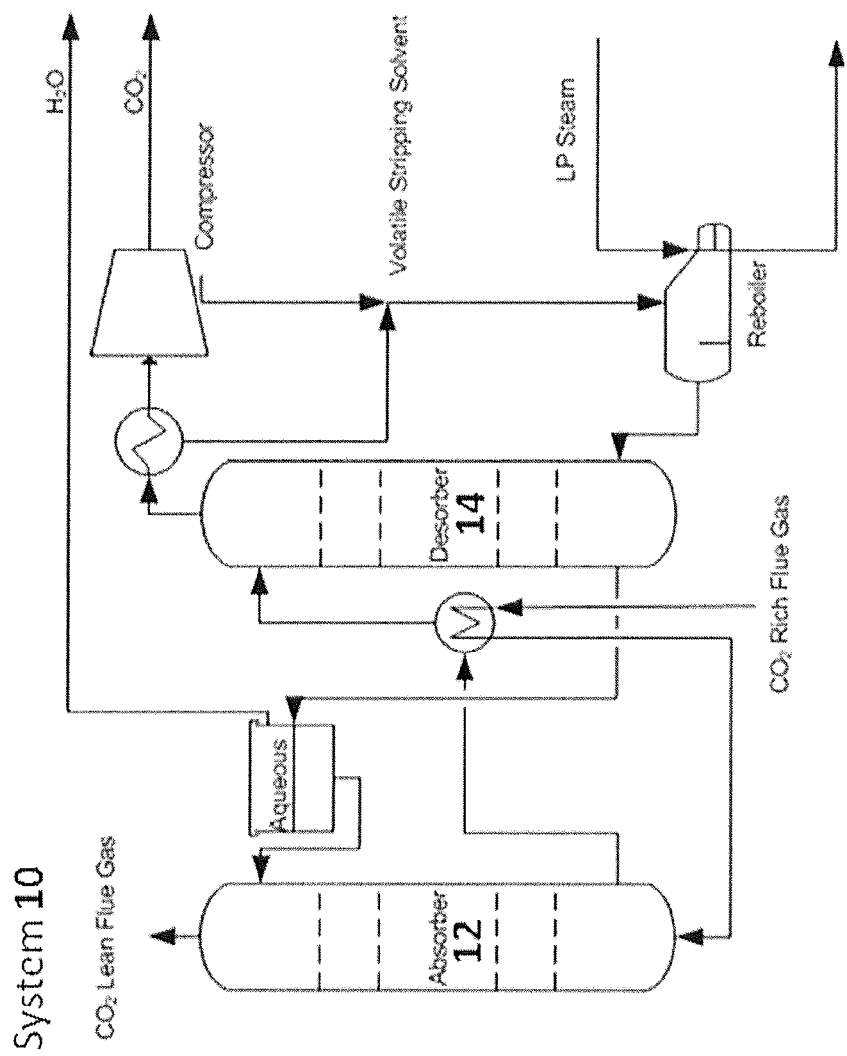
FIG. 4 is a diagram of a reboiler-assisted system embodied by the present invention for the capture of acidic gases from a mixed gas stream.
Figure 5:
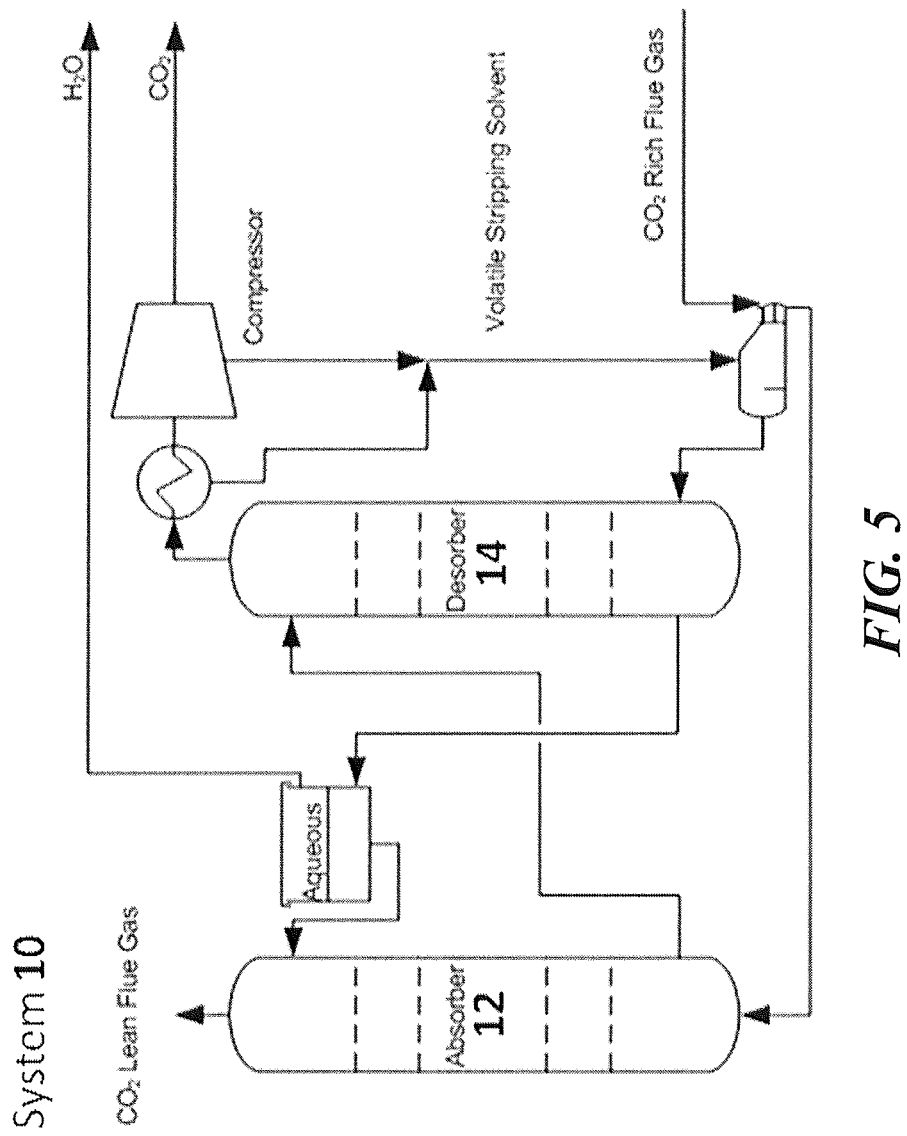
FIG. 5 is a diagram of a waste heat reboiler system embodied by the present invention for the capture of acidic gases from a mixed gas stream.
Figure 6:
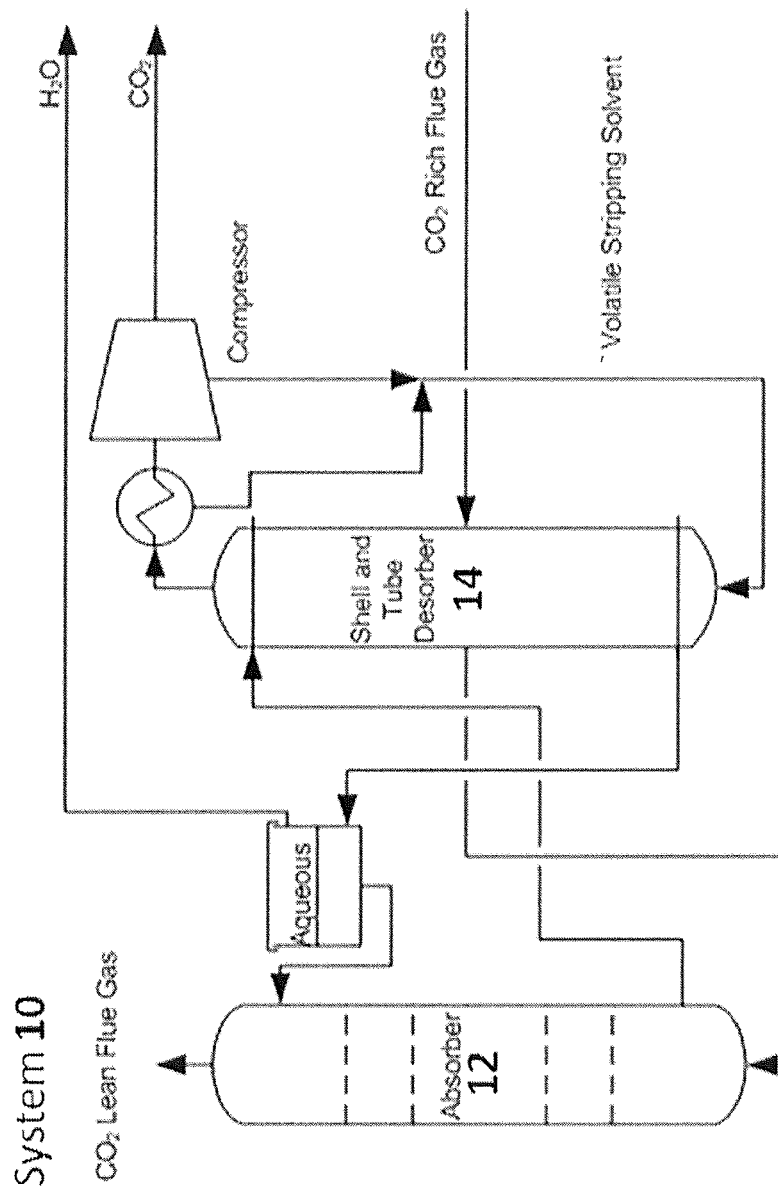
FIG. 6 is a diagram of a waste heat utilization system embodied by the present invention for the capture of acidic gases from a mixed gas stream.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements. As used in this specification and the claims, the singular forms "a," "an," and "the" include plural referents unless the context clearly dictates otherwise.

In one aspect of the present invention is provided a liquid solvent system. The solvent system may be used for the separation of acidic gases from gas mixtures. The term "acid gas" is intended to refer to any gas component that can result in formation of an acid when mixed with water. Non-limiting examples of acid gases encompassed by the present invention include $CO_2$, $SO_2$, COS, $CS_2$ and NOx. For simplicity, the invention is described below in relation specifically to $CO_2$. It is understood, however, that the present invention encompasses methods and systems for removal of any acid gas component from a gas stream.

In certain embodiments, the solvent system is regenerable in that the acidic gases can be released from the solvent, and the solvent can be reused to separate additional acidic gases from further gas mixtures. In particular embodiments, the solvent system is regenerable at temperatures lower than those typically required for solvents used for such purposes.

In some embodiments, the solvent system of the present invention comprises a mixture of a nitrogenous base component with a non-aqueous diluent. The non-aqueous diluent can be, but is not necessarily, a relatively acidic component. The term "relatively acidic component" as used herein is interchangeable with the term "acidic component" and is understood to mean a material having an acidity that is greater than the acidity of water, preferably substantially greater than the acidity of water. For example, in some embodiments, the diluent can have a pKa of less than about 15, less than about 14, less than about 13, less than about 12, less than about 11, or less than about 10. In some embodiments, the diluent has a pKa of the alcohol component is about 6 to about 15, about 7 to about 15, about 8 to about 15, about 9 to about 15, about 6 to about 14, about 7 to about 14, about 8 to about 13, about 9 to about 13, about 6 to about 12, about 7 to about 12, about 8 to about 12, about 9 to about 12, about 6 to about 11, about 7 to about 11, about 8 to about 11, about 9 to about 11, about 6 to about 10, about 7 to about 10, or about 8 to about 10.

Exemplary classes of diluents (e.g., relatively acidic diluents) that may be used according to the invention include, but are not limited to the following: fluorinated alcohols; optionally substituted phenols; and nitrogen heterocycles. Fluorinated alcohols useful according to the invention may comprise any compound having the formula R—OH, where R is an alkyl group (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_8$ alkyl, or $C_3$-$C_6$ alkyl) and wherein one or more hydrogen atoms of the alkyl group is substituted with fluorine. In some embodiments, the number of hydrogen atoms replaced with fluorine can be two, three, four, five, six, seven, eight, nine, or even more as may be deemed useful. In further embodiments, one or more of the hydrogen atoms of the alkyl group may optionally be replaced with one or more other substituents, including, but not limited to, $C_1$-$C_6$ alkyl, $C_1$-$C_6$ alkoxy, and halo substituents. Optionally substituted phenols useful in the invention are understood to mean phenols wherein one or more of the hydrogen atoms on the phenyl ring may be replaced with a substituent. Non-limiting, exemplary replacement groups for one or more of the hydrogen atoms on the phenyl ring include $C_1$-$C_6$ alkyl, $C_1$-$C_6$ alkoxy, and halo. Nitrogen heterocycles are understood to mean any cyclic compound including at least one nitrogen atom in the ring structure (including but not limited to imidazoles, pyrazoles, and triazoles) and being optionally substituted such that one or more of the hydrogen atoms on the ring structure may be replaced with a substituent. Non-limiting, exemplary replacement groups for one or more of the hydrogen atoms on the ring include $C_1$-$C_6$ alkyl, $C_1$-$C_6$ alkoxy, and halo.

In some specific embodiments, the diluent (e.g., relatively acidic diluents) may be selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7-nonafluoroheptanol; 1,1,3,3-hexafluoro-2-phenyl-2-propanol 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole; and mixtures thereof.

In other embodiments, the non-aqueous diluent is not a relatively acidic component, and does not have a pKa that falls within the ranges noted above. For example, the non-aqueous diluent may, in certain embodiments, have a pKa greater than about 15.

In certain embodiments, the non-aqueous diluent used in the solvent system may be generally selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof. In more specific embodiments, the diluent may be selected from the group consisting of fluorinated alcohols, fluorinated ketones, fluorinated aliphatic hydrocarbons, fluorinated aromatic hydrocarbons, fluorinated nitrogen heterocycles, fluorinated oxygen heterocycles, fluorinated aliphatic ethers, fluorinated cyclic ethers, fluorinated esters, and fluorinated amides and mixtures thereof. In specific embodiments the diluent may be selected from the group consisting of toluene, p-xylene, 1-methylnaphthalene, 2,4,6-dimethylaminophenol, benzylalcohol, 2,6-dimethylcyclohexanone, 3,5-lutidine, cyclohexanone, aniline, pyridine, 2-fluoroacetylphenone, 1-fluorodecane, 2,4-difluorobenzophenone, 2-fluoro-3-trifluoromethylaniline, 2-fluoroaniline, 4-fluoroaniline, 3-trifluoromethylacetophenone, 2-trifluoromethylacetophenone, bis(2,2,2-trifluoroethyl)methylphosphonate, 4-fluoro-3-(trifluoromethyl)benzaldehyde and mixtures thereof. Further, diluents within this list can be combined with diluents noted to be "relatively acidic diluents" as listed above.

The nitrogenous base according to the present invention can be characterized as any nitrogenous base having a proton that can be donated from a nitrogen, which reacts with an acid gas via a carbamate pathway and avoids reaction with the acid gas to form carbonate esters. The nitrogenous base component may, in certain embodiments, be almost any nitrogenous base that meets this requirement including, but not limited to, primary amines, secondary amines, diamines, triamines, tetraamines, pentamines, cyclic amines, cyclic diamines, amine oligomers, polyamines, alcoholamines, guanidines, amidines, and the like. In some embodiments, the nitrogenous base can have a pKa of about 8 to about 15, about 8 to about 14, about 8 to about 13, about 8 to about 12, about 8 to about 11, or about 8 to about 10. In certain embodiments, the nitrogenous base component has a pKa less than about 11.

A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl, wherein R, $R_1$, and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl). Cyclic amines are amines wherein the nitrogen atom forms part of the ring structure, and may include, but are not limited to, aziridines, azetidines, pyrrolidines, piperidines, piperazines, pyridines, pyrimidines, amidines, pyrazoles, and imidazoles. Cyclic amines may comprise one or more rings and may optionally be substituted with one or more substituents as listed above. In some embodiments, the nitrogenous base has a guanidine structure, which is optionally substituted with one or more substituents as noted above. In some embodiments, the nitrogenous base has an amidine structure, which is optionally substituted with one or more substituents as noted above. In some embodiments, the nitrogenous base may be a diamine. In some embodiments, the nitrogenous base may be a primary or secondary alcoholamine. Alcoholamines are also known as amino alcohols and contain both an alcohol and amine group. The amine group of the alcoholamine may be any type of amine as disclosed herein. In some embodiments, the alcoholamine is a primary, secondary, or tertiary alcohol amine.

In certain embodiments, the primary or secondary amine may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 3,5-di-fluorobenzylamine, D-4-fluoro-alpha-methylbenzylamine, and L-4-fluoro-alpha-methylbenzylamine.

In certain embodiments, the nitrogenous base may be selected from the group consisting of 1,4-diazabicycloundec-7-ene ("DBU"); 1,4-diazabicyclo-2,2,2-octane; piperazine ("PZ"); triethylamine ("TEA"); 1,1,3,3-tetramethyl guanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethyl amine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof. In certain embodiments, the nitrogenous base may be a guanidine or amidine.

In some embodiments, the solvent system may include a mixture comprising a nitrogenous base and a diluent, which components may be present in roughly equal proportions by molarity (i.e. are present in equimolar amounts). In certain embodiments, the diluent is present in excess. In certain embodiments, the nitrogenous base is present in excess. For example, the molar ratio of nitrogenous base to diluent can be about 1:1 to about 100:1, for example, about 1.1:1 to about 20:1, 1.1:1 to about 15:1, 1.1:1 to about 10:1, 1.1:1 to about 5:1, 1.1:1 to about 3:1, about 2:1 to about 20:1, about 2:1 to about 15:1, 2:1 to about 10:1, 2:1 to about 5:1, about 3:1 to about 20:1, about 3:1 to about 15:1, about 3:1 to about 10:1, about 4:1 to about 20:1, about 4:1 to about 15:1, about 4:1 to about 10:1, about 5:1 to about 20:1, about 5:1 to about 15:1, or about 5:1 to about 10:1. Although not wishing to be bound by theory, it is believed that the use of an additional component can be useful to reduce or prevent precipitation of solids in the solvent system. In some embodiments, the solvent system may further comprise one or more additional components. The additional components may be added, for example, to increase the solubility of the captured $CO_2$ product in the solvent system, and thus avoid the formation of precipitates. In other embodiments, however, solids formation may be desirable, and such formation may be enhanced by altering the concentration of one or more solvent components.

In some embodiments, the solvent system of the present invention is particularly useful for capturing $CO_2$ from a gas stream. The gas stream may be a mixed gas stream, having one or more other components in addition to $CO_2$. When a solution comprising a solvent system of the present invention is purged with a gas mixture containing $CO_2$, the components of the solvent system undergo a chemical reaction with $CO_2$, binding the $CO_2$ in the solution. In some embodiments, the solvent systems of the present invention have high $CO_2$ loadings. For example, the solvent systems may be useful for capturing or removing greater than about 0.05 moles $CO_2$ per mole of nitrogenous base, greater than about 0.1 moles $CO_2$ per mole of nitrogenous base, greater than about 0.2 moles $CO_2$ per mole of nitrogenous base, greater than about 0.3 moles $CO_2$ per mole of nitrogenous base, greater than about 0.4 moles $CO_2$ per mole of nitrogenous base, greater than about 0.5 moles $CO_2$ per mole of nitrogenous base, greater than about 0.6 moles $CO_2$ per mole of nitrogenous base, greater than about 0.7 moles $CO_2$ per mole of nitrogenous base, greater than about 0.8 moles $CO_2$ per mole of nitrogenous base, greater than about 0.9 moles $CO_2$ per mole of nitrogenous base, or greater than about 1 mole $CO_2$ per mole of nitrogenous base.

FIG. 1 illustrates the reaction pathway for capturing $CO_2$ using solvent mixtures comprising a nitrogenous base and a non-aqueous diluent according to the present invention. The reversible capture of $CO_2$ according to this process involves a reaction with two equivalents of a nitrogenous base diluted in a non-aqueous diluent. The reaction involves formation of a carbamate and avoids the formation of a carbonate ester. As illustrated in FIG. 1, only the nitrogenous base (i.e., not the diluent) is shown to react with $CO_2$ from the gas stream, with capture of $CO_2$ substantially (including solely) as a carbamate salt. The resulting solution can be either ionic or non-ionic.

Accordingly, the invention provides a solvent system comprising a solution formed of: a nitrogenous base having a nitrogen with a hydrogen atom leaving group; and a diluent, wherein the nitrogenous base has a structure such that it reacts with an acidic gas so as to form a carbamate salt or a heteroatom analogue of a carbamate salt without any substantial formation of a carbonate ester, preferably with no formation of a carbonate ester. Substantial is defined herein as meaning that the product of the reaction is at least about 80% carbamate salt, at least about 98% carbamate salt, at least about 99% carbamate salt, at least about 99.5% carbamate salt, at least about 99.9% carbamate salt and most desirably, 100% carbamate salt. Thus, the product of the reaction can be characterized as having less than about 20% carbonate ester, less than about 2% carbonate ester, less than about 1% carbonate ester, less than about 0.5% carbonate ester, less than about 0.1% carbonate ester, and most desirably, 0% carbonate ester.

In certain embodiments, the diluent is selected such that it has low miscibility with water. For example, in some embodiments, the diluent has a solubility of less than or equal to about 10 g/100 mL in water at 25° C. (i.e., 10 g of solvent per 100 mL of water). In other embodiments, the diluent has a solubility in water of less than or equal to about 0.01 g/100 mL, less than or equal to about 0.1 g/100 mL, less than or equal to about 0.5 g/100 mL, less than or equal to about 1 g/100 mL, less than or equal to about 1.5 g/100 mL, less than or equal to about 2 g/100 mL, less than or equal to about 2.5 g/100 mL, less than or equal to about 3 g/100 mL, less than or equal to about 4 g/100 mL, less than or equal to about 5 g/100 mL, less than or equal to about 6 g/100 mL, less than or equal to about 7 g/100 mL, less than or equal to about 8 g/100 mL, or less than or equal to about 9 g/100 mL in water at 25° C. In some embodiments, the diluent is completely immiscible with water. Using diluents with low water solubility may result in solvent systems that display one or more of the following attributes: they may require less energy for regeneration; may have high $CO_2$ loading capacities; may be able to tolerate water in the gas stream; and/or may be able to be separated from water without a large energy penalty.

In additional embodiments, the nitrogenous based component of the solvent system is similarly selected such that it has low miscibility with water. In preferred embodiments, the nitrogenous base has higher miscibility with the diluent than with water. In some embodiments, the nitrogenous base has high solubility in the diluent. Examples of such nitrogenous bases include, but are not limited to, aliphatic amines with one or more hydrocarbon chains composed of three or more carbons, and aliphatic amines with one or more hydrocarbon chains composed of three or more carbons with one or more fluorine atoms substituted for hydrogen in the hydrocarbon chain. It is noted that although diluents and/or nitrogenous bases having low miscibility with water are preferred, the present invention also encompasses solvent systems wherein the diluents, nitrogenous base, and/or combination thereof are at least partially miscible with water.

In some embodiments, the solvent system is tolerant to the presence of water. In certain embodiments, the solvent system tolerates water up to or equal to about 30% water by volume. For example, in some embodiments, the solvent system tolerates up to or equal to about 25% water by volume, up to or equal to about 20%, up to or equal to about 15%, up to or equal to about 10%, up to or equal to about 5%, up to or equal to about 2%, or up to or equal to about 1% water by volume. In some embodiments, tolerance to the presence of water means that there is little to no degradation of the solvent performance up to the indicated volume of water. In some embodiments, the solvent system maintains at or near its initial capacity for $CO_2$ loading up to the indicated volume of water.

In preferred embodiments, the $CO_2$ captured using the solvent system of the present invention may be released to regenerate the solvent system for reuse. It is preferred that the solvent system is regenerable (or reaction with the $CO_2$ is reversible) under mild conditions (e.g., at a low temperature). In some embodiments, the release of $CO_2$ and corresponding regeneration of the solvent system is effectuated by heating the solution. When the solution containing bound $CO_2$ is heated, the chemical reaction is reversed and the $CO_2$ is released, producing a concentrated $CO_2$ stream.

In some embodiments, the present application relates to a solvent system and process for the removal of $CO_2$ from a gas stream. The present invention applies to any gas stream containing $CO_2$. For example, in particular embodiments, the invention relates to a process for the removal of $CO_2$ from fossil fuel combustion flue gas, a natural gas mixture, or a mixture of respiration gases from closed environments containing $CO_2$. The process involves passing the mixed gas stream through a solvent system comprising a diluent and a nitrogenous base component. In some embodiments, the present invention further relates to the regeneration of the solvent system, which releases the $CO_2$. In some embodiments, regeneration of the solvent system involves heating the solvent system at a temperature sufficient to release the $CO_2$. In some embodiments, the process involves heating the solvent system at a temperature at or below about 200° C., for example, at or below about 185° C., at or below about 150° C., or at or below about 125° C. In preferred embodiments, the process involves heating the solvent system at a temperature at or below about 100° C., for example, at a temperature at or below about 95° C., at or below about 90° C., at or below about 85° C., at or below about 80° C., at or below about 75° C., or at or below about 70° C. In some embodiments, the $CO_2$ may be released at ambient temperature. In certain embodiments, the $CO_2$ is captured in a non-aqueous phase under conditions in which water accumulates as a separate, lower density phase. This phase can be sent to the regenerator with the rich, non-aqueous phase to be regenerated at a lower temperature than the corresponding rich aqueous phase alone. This can be followed by phase separation from the lean, regenerated solvent before being sent back to the absorber.

In certain embodiments, at or about 100% of the $CO_2$ is removed from the $CO_2$-rich solvent system. However, in other embodiments, less than 100% of the $CO_2$ is removed from the $CO_2$-rich solvent system. In preferred embodiments, about 50 to 100% of the captured $CO_2$ is removed from the $CO_2$-rich solvent system, preferably about 75% to 100%, about 80% to 100%, about 90% to 100%, about 95% to about 100%, or about 98% to 100%. For example, in some embodiments, at least about 98%, 95%, 90%, 85%, 80%, 75%, 70%, 60%, or 50% of the captured $CO_2$ is removed from the $CO_2$-rich solvent system.

In some embodiments, the removal of $CO_2$ from gas mixtures containing $H_2O$ in addition to $CO_2$ can lead to the accumulation of $H_2O$ in the solvent system, either as a single phase or biphase solution, depending upon the reaction conditions. As noted above, the presence of $H_2O$ in the solvent mixture may be disadvantageous because of an undesirable side reaction, and more energy will be required for solvent regeneration due to the necessity of removing water from the solvent. Thus, the accumulation of $H_2O$ in the solvent system may increase the regeneration energy demand, decreasing the efficiency of the regeneration system.

In some embodiments, the process of the present invention provides a method by which the detrimental effects of $H_2O$ accumulation in the solvent system may be avoided. For example, the detrimental effect of $H_2O$ accumulation on the solvent system regeneration energy demand may be minimized, by providing a process by which the $CO_2$ is captured within the solvent system at a temperature greater than the $H_2O$ saturation temperature of the gas mixture. Additionally, the detrimental effect of $H_2O$ accumulation on the solvent system regeneration energy demand may be minimized by providing a process by which the $H_2O$ accumulates as a separate, aqueous phase within the solvent system. This process involves the use of a solvent system that exhibits little or no solubility in water. In such a system, water that collects is present as a separate phase. The separate, aqueous phase may be decanted or centrifuged off by mechanical, rather than thermal, processes, minimizing the energy required to maintain an efficient $CO_2$ removal system. For example, as the hydrocarbon chain of aliphatic alcohols is increased in length, the solubility of the alcohol in water decreases. This is also true for fluorinated alcohols. For example, 2,2,3,3,4,4,5,5-octafluoropentanol ("OFP") is essentially immiscible with water. Thus, a solvent system comprising an appropriate nitrogen base and OFP forms a biphasic liquid solution when combined with water. In such a solvent, water can be separated from the solvent system without distillation or the use of a membrane by decanting or centrifugation of the aqueous layer from the fluorinated phase. In some embodiments, after removal of the $H_2O$, the $CO_2$-rich solvent system can be regenerated at a low temperature with the addition of low boiling diluents to satisfy the partial pressure requirements. The solvent system could thus avoid the added energy penalty associated with the distillation of water. By providing a non-aqueous $CO_2$ absorbing solvent system with low water solubility, the solvent system has lower energy demands and milder regeneration conditions than those of aqueous or high-water affinity $CO_2$ solvent systems.

In some embodiments, a system for the removal of $CO_2$ from a gas stream is provided. A schematic of an exemplary system of the present invention is depicted in FIGS. 2 through 6. The $CO_2$ removal system 10 includes an absorber 12 configured with an inlet to receive a gas stream. The gas stream may come directly from, e.g., a combustion chamber of a boiler system in a power generation plant. The gas stream may or may not be passed through other cleaning systems prior to entering the $CO_2$ removal system. The absorber may be any chamber wherein a solvent system for the removal of $CO_2$ is contained, having an inlet and outlet for a gas stream, and wherein the gas stream may be brought into contact with the solvent system. Within the absorber, the $CO_2$ may be transferred from gaseous phase to liquid phase according to the principles discussed herein. The absorber may be of any type; for example, the absorber may comprise a spray-tower absorber, packed-bed absorber (including countercurrent-flow tower or cross-flow tower), tray-tower absorber (having various tray types, including bubble-cap trays, sieve trays, impingement trays, and/or float valve trays), venture absorber, or ejector absorber. The temperature and pressure within the absorber may be controlled. For example, in one embodiment, the temperature of the absorber may be maintained at or near 50-60° C. and the absorber may be maintained at or near atmospheric pressure. Thus, the absorber may be equipped with a heating/cooling system and/or pressure/vacuum system.

Within the absorber, the gas stream is brought into fluid contact with and passed through a solvent system comprising a diluent and a nitrogenous base component. The solvent system reacts with the $CO_2$ present in the gas stream, capturing it from the remaining components of the gas, and the resulting $CO_2$-free gas stream is released from the absorber through an outlet. The solvent system continues to react with entering $CO_2$ as the mixed gas stream is passed through, until it becomes "rich" with $CO_2$. The absorber is optionally connected to one or more components. For example, the absorber is preferably configured with a means for routing solvent to a unit wherein water may be decanted, centrifuged, or otherwise removed from the system.

At any stage in the process of $CO_2$ capture, the solvent system may be regenerated. The system therefore includes an optional regeneration system 14 to release the captured $CO_2$ via a separate $CO_2$ gas stream and thus regenerate the solvent system. The regeneration system is configured to receive a feed of "rich" solvent from absorber and to return regenerated solvent to the absorber once $CO_2$ has been separated from the "rich" solvent. The regeneration system may simply comprise a chamber with a heating unit to heat the solvent system at a temperature sufficient to release the gas, along with a release valve to allow the $CO_2$ to be removed from the regeneration system. It may also be a distillation column and have essentially the same design as described above for the absorption column. The regenerator may be optionally connected to one or more components. For example, the regenerator is preferably configured with a means for routing solvent to a unit wherein water may be decanted, centrifuged, or otherwise removed from the system.

The released $CO_2$ can be output to storage or for other predetermined uses. The regenerated solvent is again ready to absorb $CO_2$ from a gas stream, and may be directed back into the absorber.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

EXPERIMENTAL

The following example is provided for the purpose of complete disclosure and is not to be viewed as limiting of the invention.

Example 1

Reaction Between $CO_2$ and 2-Fluorophenethylamine in Solution with 4-Methoxy Phenol as Diluent Reaction between $CO_2$ and 2-fluorophenethylamine (2-FPEA) in solution with a methyl substituted phenol, specifically for this example 4-methoxy phenol (4-MeOPh), was initially observed using a standard semi-batch reactor system in which the amine solution was contained in the reaction vessel and a gas stream containing $CO_2$ was bubbled through the amine solution. The $CO_2$ concentration of the feed gas and reactor outlet gas streams was monitored via a NDIR $CO_2$ analyzer to determine extent of $CO_2$-amine reaction. Upon introduction of the $CO_2$ containing gas stream to the amine solution resulted in a reduction in the $CO_2$ content of the reactor outlet gas stream indicating that $CO_2$ was reacting with the amine solution. Reaction with $CO_2$ was accompanied by a small temperature rise in amine solution temperature from 25.5 to 27° C. due to the exothermic nature of the reaction. The reaction was continued until the $CO_2$ concentration in the reactor outlet stream achieved >95% of the feed concentration. Integration of the quantity of $CO_2$ reacted with the amine solution indicated that a $CO_2$:amine molar ratio of 0.37:1 was achieved.

Reversibility of the reaction between $CO_2$ and the 2-FPEA/4-MeOPh solvent system was observed by ramping the temperature of the 2-FPEA/4-MeOPh/$CO_2$ system, described above, to 80° C. under a $N_2$ purge. The release of $CO_2$ from the $CO_2$-containing solution was monitored via a NDIR $CO_2$ analyzer. Integration of the quantity of $CO_2$ released indicated that $CO_2$ was completely released from both solvent systems.

Example 2

Reaction Between $CO_2$ and 2-Fluorophenethylamine in Solution with 2,2,3,3-Tetrafluoropropanol (TFP) and 2,2,3,3,4,4,5,5-Octafluoropentanol (OFP) as Diluents Reaction between $CO_2$ and 2-fluorophenethylamine (2-FPEA) in solution with fluorinated alcohols, specifically for this example 2,2,3,3-tetrafluoropropanol (TFP) and 2,2,3,3,4,4,5,5-octafluoropentanol (OFP), was initially observed using a standard semi-batch reactor system in which the amine solution was contained in the reaction vessel and a gas stream containing $CO_2$ was bubbled through the amine solution. The $CO_2$ concentration of the feed gas and reactor outlet gas streams was monitored via a NDIR $CO_2$ analyzer to determine extent of $CO_2$-amine reaction. For both amine solutions, 2-FPEA/TFP and 2-FPEA/OFP, the uptake of $CO_2$ was very rapid and near complete removal of $CO_2$ from the flowing gas stream was observed. Reaction with $CO_2$ was accompanied by a rise in amine solution temperature from 26.5 to 29.5° C. (2-FPEA/TFP) and 23.6 to 26.6° C. (2-FPEA/OFP) due to the exothermic nature of the reaction. The reaction was continued until the $CO_2$ concentration in the reactor outlet stream achieved >95% of the feed concentration. Integration of the quantity of $CO_2$ reacted with the amine solution indicated that a $CO_2$:amine molar ratio of 0.43:1 for the 2-FPEA/TFP and 0.47:1 for 2-FPEA/OFP was achieved.

Figure 7:
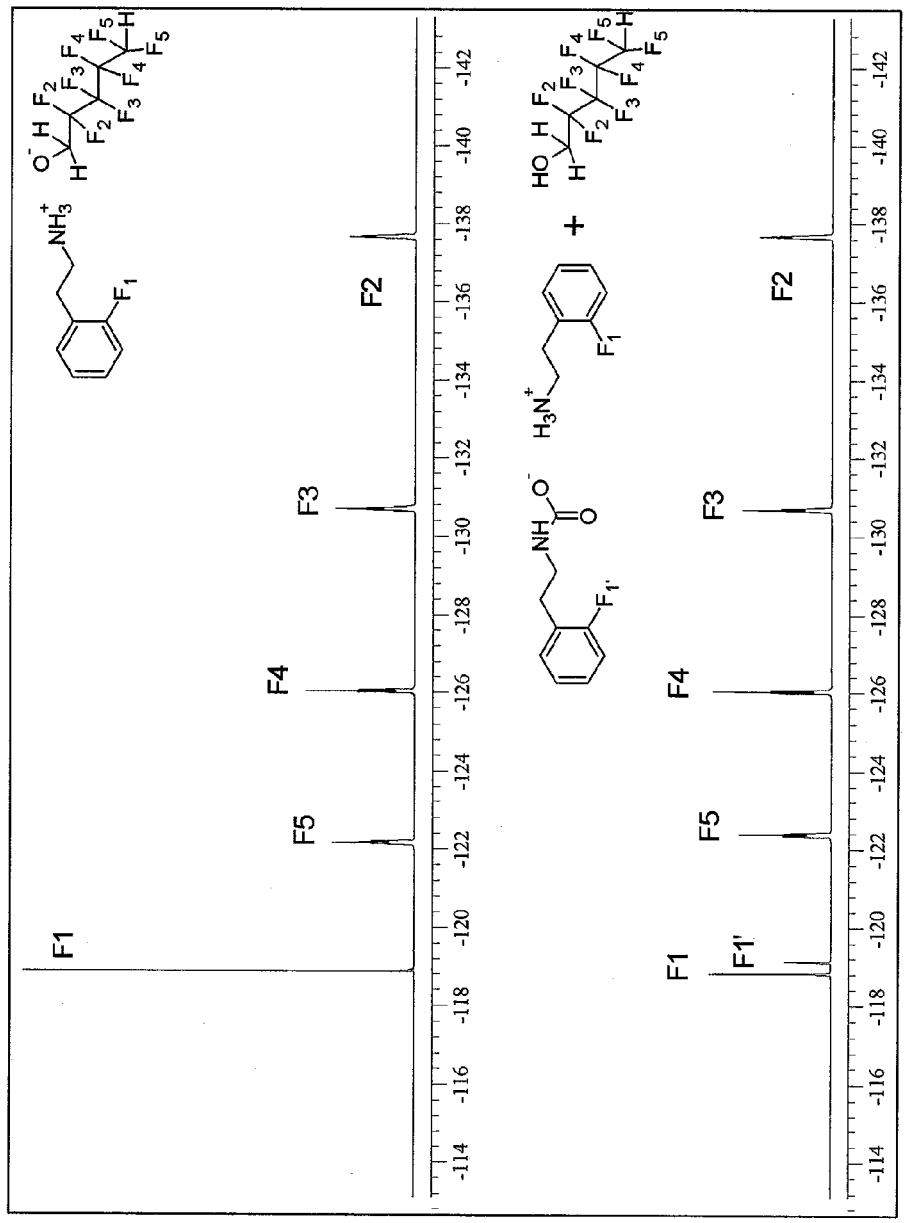
FIG. 7 is a fluorine NMR spectrum of 2-fluorophenethylamine and 2,2,3,3,4,4,5,5-octafluoropentanol before (top) and after (bottom) reaction with $CO_2$, showing six unique resonances in the product.

$^{19}F$ NMR was performed for the 2-FPEA/OFP/$CO_2$ mixture to characterize the product of the amine-$CO_2$ reactions. Deuterated chloroform was used as the NMR solvent. $^{19}F$ NMR of the 2-FPEA/OFP mixture is shown in the top spectrum of FIG. 7. Five unique $^{19}F$ resonances correspond to the fluorine nuclei labeled F1 associated with 2-FPEA and F2, F3, F4, and F5 associated with OFP are observable. After purging the 2-FPEA/OFP mixture with $CO_2$, a total of six unique $^{19}F$ resonances are observed that correspond to the fluorine nuclei labeled F1, F1', F2, F3, F4, and F5 as shown in the bottom spectrum of FIG. 7. The new F1' resonance is associated with the $CO_2$-amine reaction product—2-fluorophenethylamine carbamate. No shift in the fluorine nuclei associated with OFP was observed, indicating that the fluorinated alcohol was not involved in the $CO_2$-amine reaction pathway and serves as a diluent.

Example 3

Figure 8:
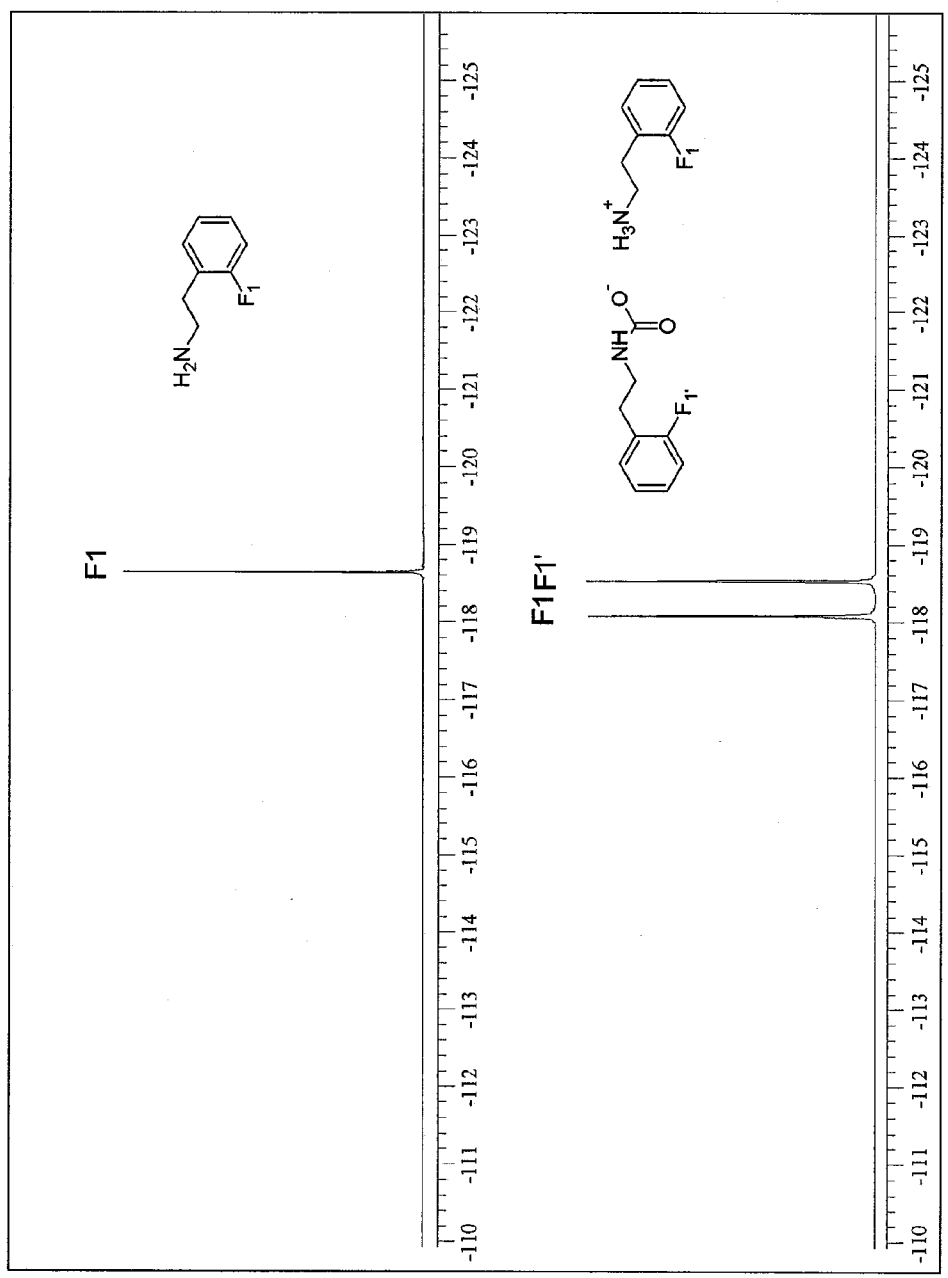
FIG. 8 is fluorine NMR spectra of 2-FPEA before (top) and after (bottom) reaction with $CO_2$.
Figure 9:
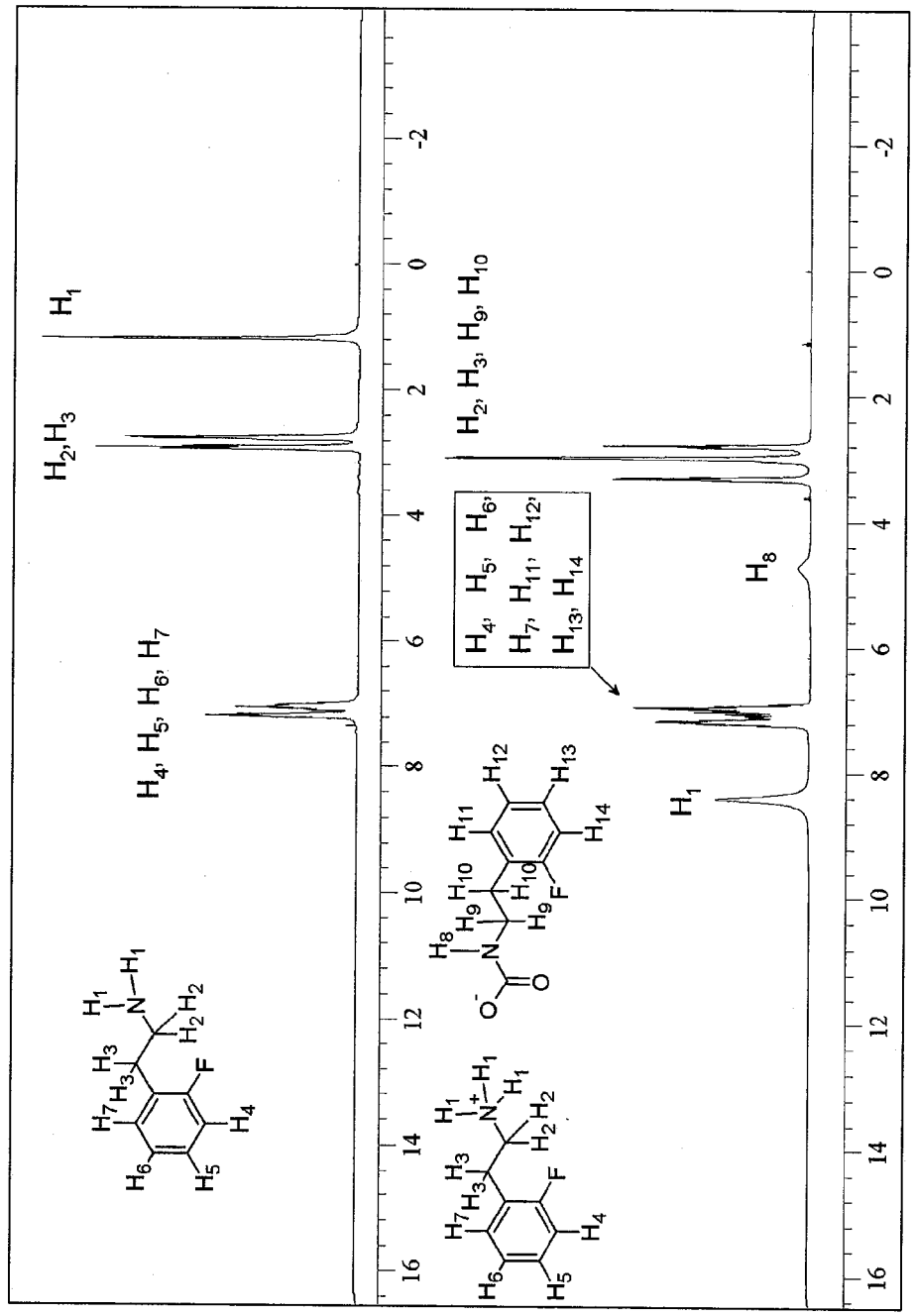
FIG. 9 is a $^1$H NMR spectrum showing transformation of 2-fluorophenethylamine into 2-fluorophenethylamine carbamate upon reaction with carbon dioxide.

Reaction Between $CO_2$ and 2-Fluorophenethylamine in Solution with Chloroform as Diluent Observation of the reaction between $CO_2$ and 2-fluorophenethylamine (2-FPEA) in solution with chlorinated hydrocarbons, specifically for this example deuterated chloroform, was observed by $^1H$ and $^{19}F$ NMR. An NMR experiment was conducted in deuterated chloroform solvent containing only 2-fluorophenethylamine. $^{19}F$ NMR of 2-FPEA/deuterated chloroform mixture is shown in the top spectrum of FIG. 8 and shows a single $^{19}F$ resonance corresponding to the fluorine nuclei labeled F1 associated with 2-FPEA. After purging the 2-FPEA/deuterated chloroform mixture with $CO_2$, a total of two unique $^{19}F$ resonances are observed that correspond to the fluorine nuclei labeled F1 and F1' as shown in the bottom spectrum of FIG. 8. The new F1' resonance is associated with the $CO_2$-amine reaction product—2-fluorophenethylamine carbamate. The corresponding $^1H$ NMR spectra, shown in FIG. 9 also indicate that the 2-fluorophenethylamine carbamate is formed. Notably, the resonances for the amide N—H(H8) and protonated —$NH_3^+$ (H1) are clearly observable. No evidence for the involvement of the involvement of the chlorinated hydrocarbon in the $CO_2$-amine reaction pathway was observed indicating that it acts as a diluent.

Example 4

Reaction Between $CO_2$ and 3-Fluoro-N-Methylbenzylamine with 2,2,3,3,4,4-Hexafluorobutanol (HFB) and 4,4,5,5,6,6,7,7,7-Nonafluoroheptanol (NFHp) as Diluent Reaction between $CO_2$ and 3-fluoro-N-methylbenzylamine (3-FNMBA) in solution with fluorinated alcohols, specifically for this example 2,2,3,3,4,4-hexafluorobutanol (HFB) and 4,4,5,5,6,6,7,7,7-nonafluoroheptanol (NFHp), was initially observed using a standard semi-batch reactor system in which the amine solution was contained in the reaction vessel and a gas stream containing $CO_2$ was bubbled through the amine solution. The $CO_2$ concentration of the feed gas and reactor outlet gas streams was monitored via a NDIR $CO_2$ analyzer to determine extent of $CO_2$-amine reaction. For both amine solutions, 3-FNMBA/HFB and 3-FNMBA/NFHp, the uptake of $CO_2$ was very rapid and near complete removal of $CO_2$ from the flowing gas stream was observed. Reaction with $CO_2$ was accompanied by a rise in amine solution temperature from 25.2 to 28.7° C. (3-FN-MBA/HFB) and 21.9 to 26.4° C. (3-FNMBA/NFHp) due to the exothermic nature of the reaction. The reaction was continued until the $CO_2$ concentration in the reactor outlet stream achieved >95% of the feed concentration. Integration of the quantity of $CO_2$ reacted with the amine solution indicated that a $CO_2$:amine molar ratio of 0.36:1 for the 3-FNMBA/HFB and 0.47:1 for 3-FNMBA/NFHp was achieved.

Figure 10:
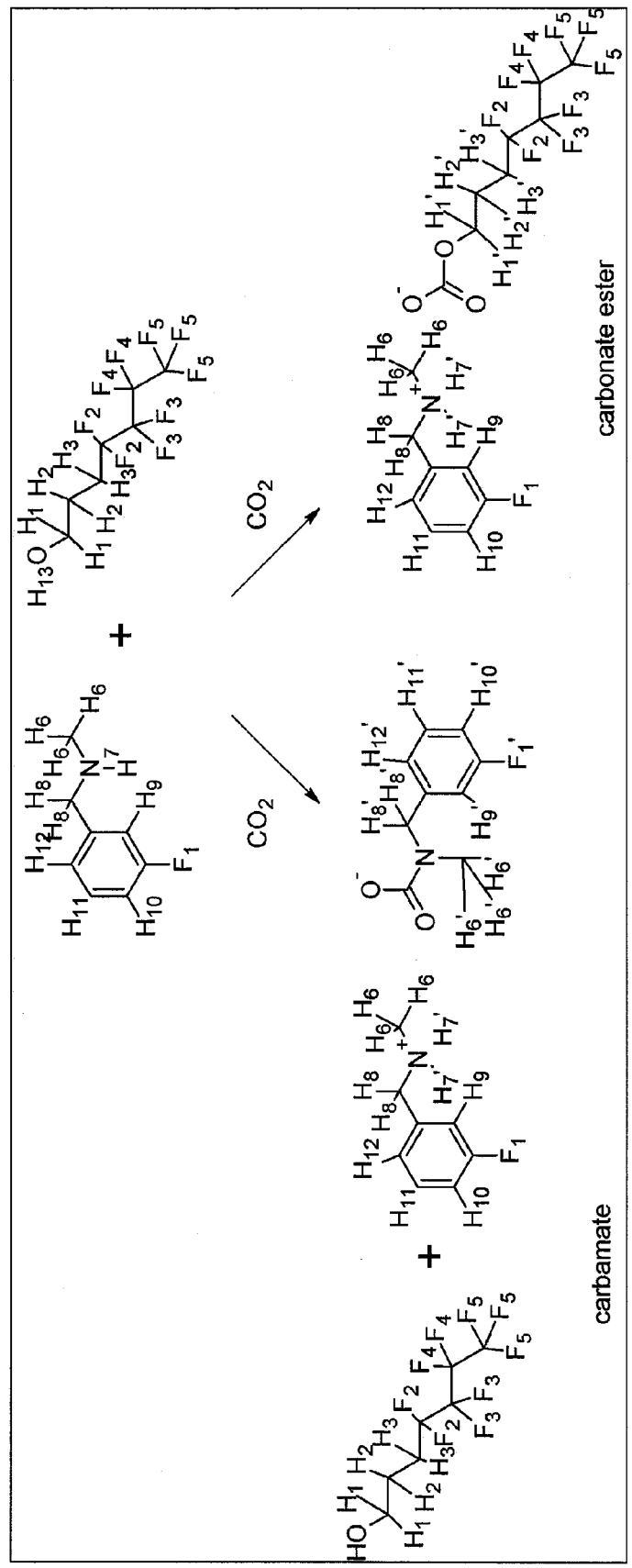
FIG. 10 shows reaction pathways with carbon dioxide for the solvent 3-fluoro-N-methylbenzylamine in 4,4,5,5,6,6,7,7-nonafluorheptanol, where all relevant hydrogen and fluorine nuclei are labeled for discussion herein.
Figure 11:
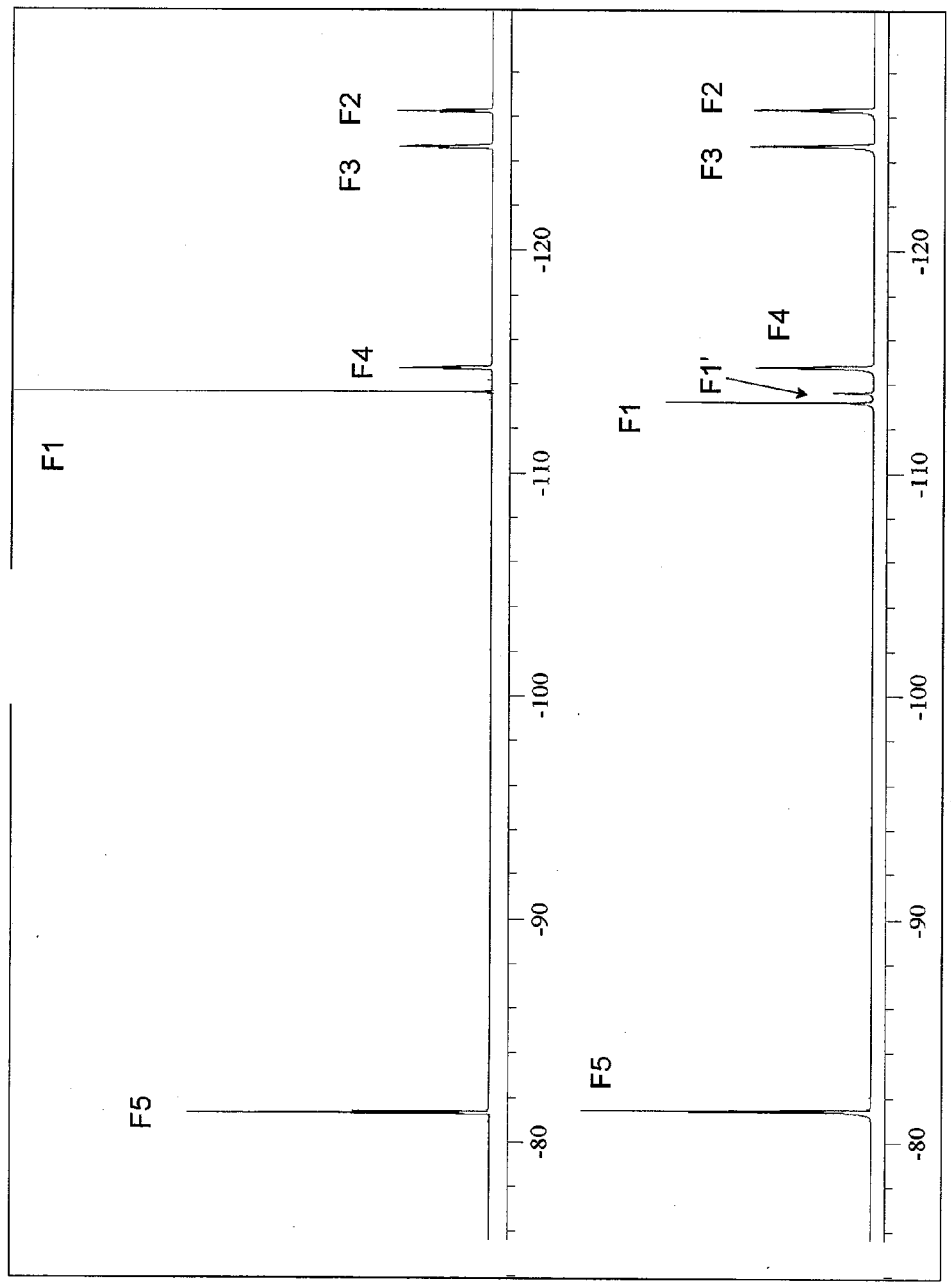
FIG. 11 is fluorine NMR spectra following the transformation of 3-FNMBA/NFHp solvent (top) with the addition of $CO_2$ (bottom)
Figure 12:
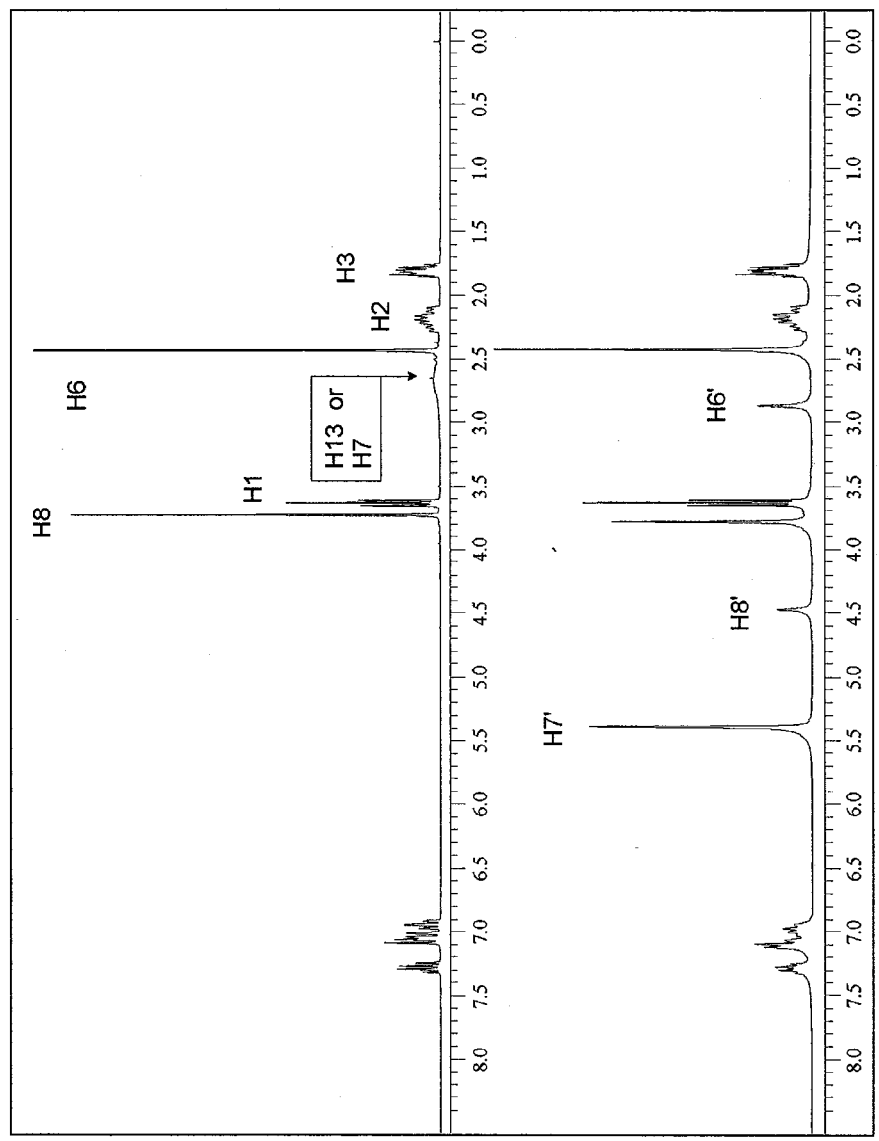
FIG. 12 is $^1$H NMR spectra of the transformation occurring with purging of 3-FNMBA/NFHp with $CO_2$, showing fluorinated alcohol $^1$H resonances unaffected by $CO_2$ absorption.

$^1H$ and $^{19}F$ NMR was performed on the 3-FNMBA/NFHp/$CO_2$ mixture to characterize the product of the amine-$CO_2$ reactions. Deuterated chloroform was used as the NMR solvent. FIG. 10 shows the two reaction pathways with $CO_2$ which could be theorized for the solvent. All relevant hydrogen and fluorine nuclei are labeled. $^{19}F$ NMR of the 3-FNMBA/NFHp mixture is shown in the top spectrum of FIG. 11. After purging the 3-FNMBA/NFHp mixture with $CO_2$, a total of six unique $^{19}F$ resonances are observed that correspond to the four associated with the diluent fluorinated heptanol (F2, F3, F4, F5), one associated with the amine starting material (F1), and one associated with the carbamate salt (F1') as shown in the bottom spectrum of FIG. 11. The new F1' resonance is associated with the $CO_2$-amine reaction product—3-FNMBA carbamate. Examination of the $^1H$ NMR (FIG. 12) of the 3-FNMBA/NFHp mixture (top) compared to the $^1H$ NMR of the 3-FNMBA/NFHp/$CO_2$ mixture (bottom) also shows no change in the resonances associated with the methylene C—H bonds of the fluorinated alcohol (H1, H2, H3). Instead, only $^1H$ resonances associated with carbamate formation are observed (H6', H7', H8'). No shift in the proton or fluorine nuclei associated with NFHp was observed indicating that the fluorinated alcohol was not involved in the $CO_2$-amine reaction pathway and serves as a diluent.

Reversibility of the reaction between $CO_2$ and the 3-FNMBA/HFB and 3-FNMBA/NFHp solvent systems was observed by ramping the temperature of the 3-FNMBA/HFB/$CO_2$ and 3-FNMBA/NFHp/$CO_2$ systems, described above, to 80° C. under a $N_2$ purge. The release of $CO_2$ from the $CO_2$-containing solution was monitored via a NDIR $CO_2$ analyzer. Integration of the quantity of $CO_2$ released from the 3-FNMBA/HFB/$CO_2$ and 3-FNMBA/NFHp/$CO_2$ systems indicated that $CO_2$ was completely released from both solvent systems.

Example 5

Figure 13:
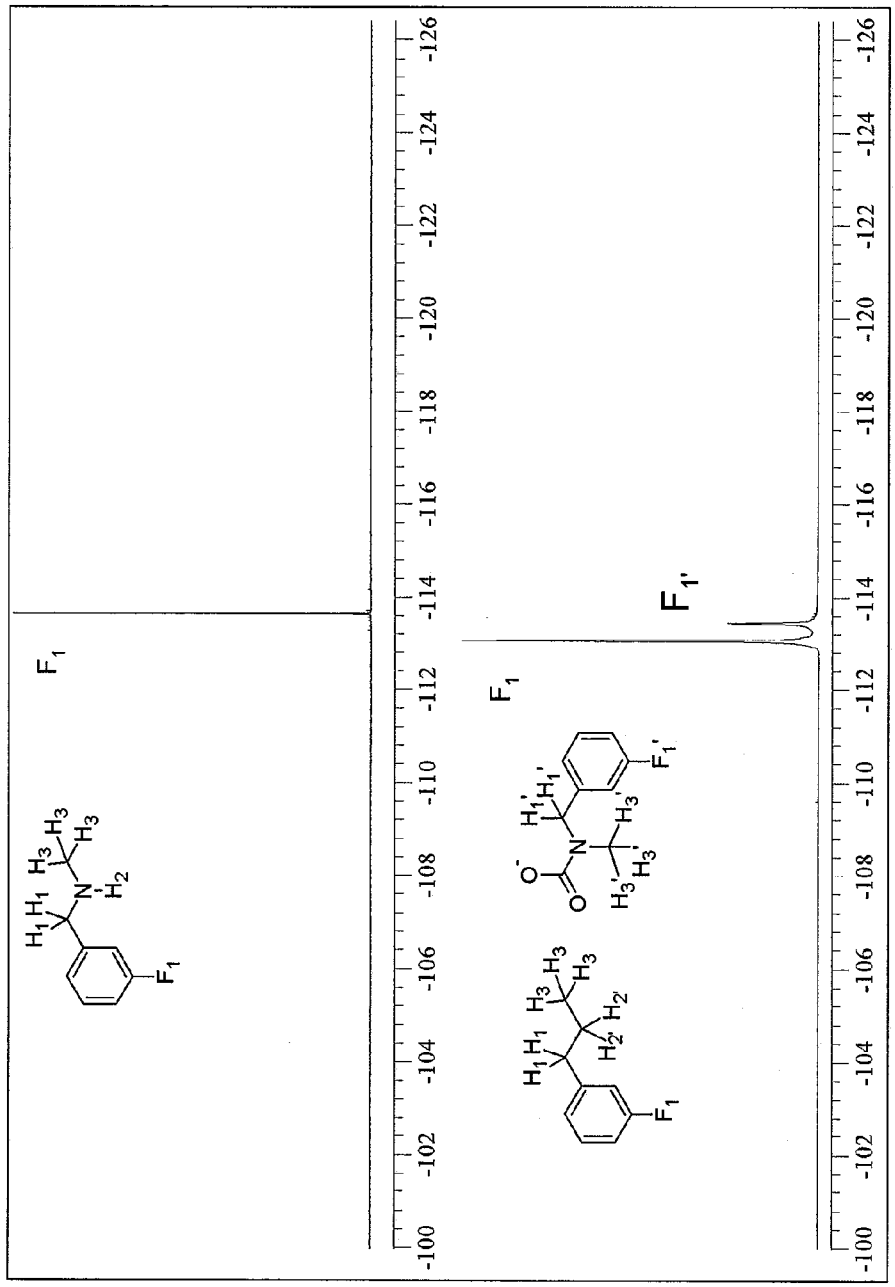
FIG. 13 is fluorine NMR spectra of 3-FNMBA before (top) and after (bottom) reaction with $CO_2$.
Figure 14:
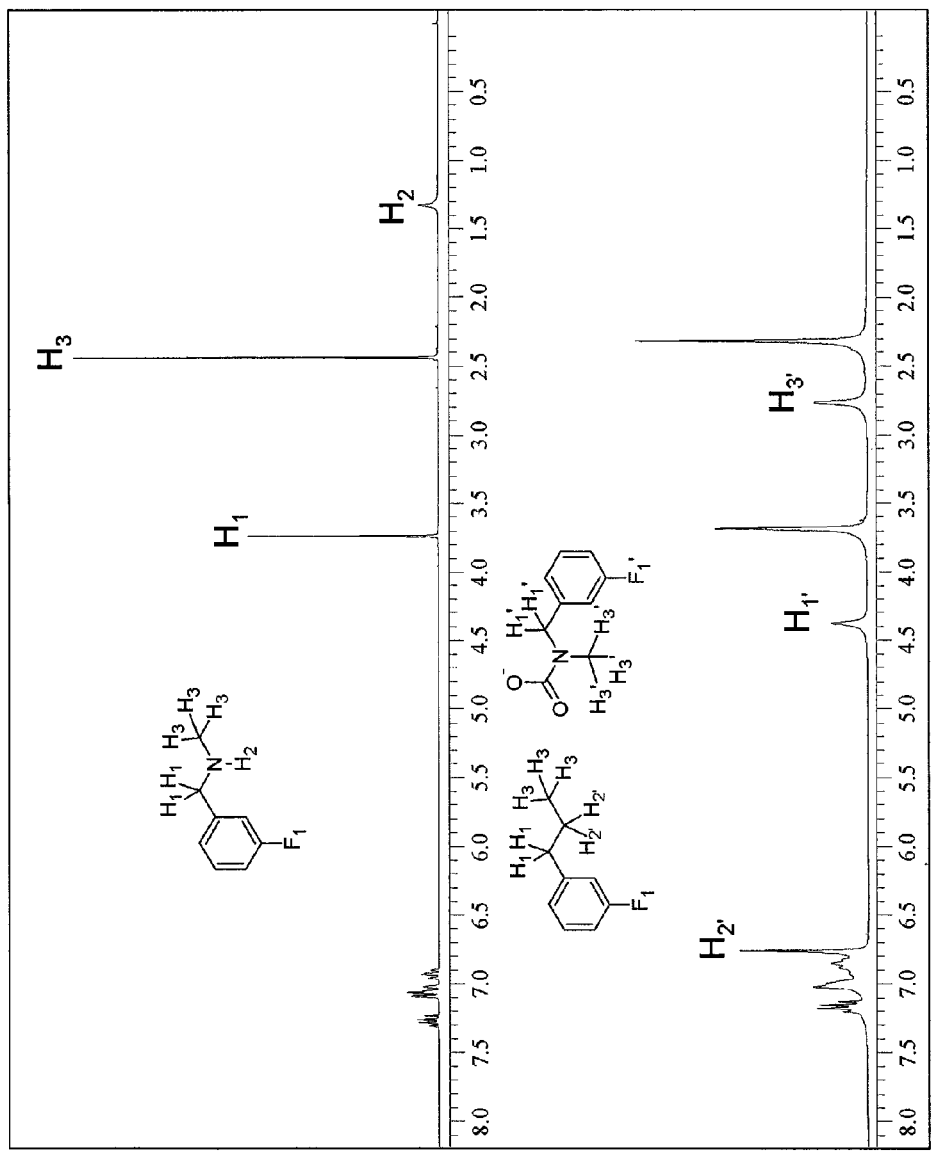
FIG. 14 is $^1$H NMR spectra showing transformation of 3-fluoro-N-methylbenzylamine into 3-fluoro-N-methylbenzylamine carbamate upon reaction with carbon dioxide.

Reaction between $CO_2$ and 3-fluoro-N-methylbenzylamine in solution with chloroform as diluent Observation of the reaction between $CO_2$ and 3-fluoro-N-methylbenzylamine (3-FNMBA) in solution with chlorinated hydrocarbons, specifically for this example deuterated chloroform, was observed by $^1H$ and $^{19}F$ NMR. An NMR experiment was conducted in deuterated chloroform solvent containing only 3-FNMBA. $^{19}F$ NMR of 3-FNMBA/deuterated chloroform mixture is shown in the top spectrum of FIG. 13 and shows a single $^{19}F$ resonance corresponding to the fluorine nuclei labeled F1 associated with 3-FNMBA. After purging the 3-FNMBA/deuterated chloroform mixture with $CO_2$, a total of two unique $^{19}F$ resonances are observed that correspond to the fluorine nuclei labeled F1 and F1' as shown in the bottom spectrum of FIG. 13. The new F1' resonance is associated with the $CO_2$-amine reaction product—3-fluoro-N-methylbenzylamine carbamate. The corresponding $^1H$ NMR spectra, shown in FIG. 14 also indicate that the 3-fluoro-N-methylbenzylamine carbamate is formed. Notably, the resonances for the amide N—H(H2) and protonated—$NH_2^+$ (H2') are clearly observable. No evidence for the involvement of the involvement of the chlorinated hydrocarbon in the $CO_2$-amine reaction pathway was observed indicating that it acts as a diluent.

The invention claimed is:
1. A non-aqueous solvent system comprising a solution formed of:
a nitrogenous base having a nitrogen with a hydrogen atom leaving group, wherein the nitrogenous base has a structure such that it reacts with an acidic gas so as to form a carbamate salt or a heteroatom analogue of a carbamate salt without any substantial formation of a carbonate ester or a heteroatom analogue of a carbonate ester; and
a diluent that is non-reactive with the acidic gas,
wherein the solvent system has a solubility with water of less than about 10 g of solvent per 100 mL of water.
2. The solvent system of claim 1, wherein the diluent is selected from the group consisting of fluorinated alcohols, optionally substituted phenols, nitrogen heterocycles, and mixtures thereof.
3. The solvent system of claim 1, wherein the diluent is selected from the group consisting of: 2,2,3,3,4,4,5,5-octafluoropentanol ("OFP"); 2,2,3,3,3-pentafluoropropanol ("PFP"); 2,2,3,3,4,4-hexafluorobutanol ("HFB"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole; and mixtures thereof.
4. The solvent system of claim 1, wherein the diluent is selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof.
5. The solvent system of claim 1, wherein the diluent is selected from the group consisting of fluorinated alcohols, fluorinated ketones, fluorinated aliphatic hydrocarbons, fluorinated aromatic hydrocarbons, fluorinated nitrogen heterocycles, fluorinated oxygen heterocycles, fluorinated aliphatic ethers, fluorinated cyclic ethers, fluorinated esters, and fluorinated amides and mixtures thereof.
6. The solvent system of claim 1, wherein the diluent is selected from the group consisting of toluene, p-xylene, 1-methylnaphthalene, 2,4,6-dimethylaminophenol, benzylalcohol, 2,6-dimethylcyclohexanone, 3,5-lutidine, cyclohexanone, aniline, pyridine, 2-fluoroacetylphenone, 1-fluorodecane, 2,4-difluorobenzophenone, 2-fluoro-3-trifluoromethylaniline, 2-fluoroaniline, 4-fluoroaniline, 3-trifluoromethylacetophenone, 2-trifluoromethylacetophe- none, bis(2,2,2-trifluoroethyl)methylphosphonate, 4-fluoro-3-(trifluoromethyl)benzaldehyde and mixtures thereof.

7. The solvent system of claim 1, wherein the nitrogenous base has a pKa of about 8 to about 15.

8. The solvent system of claim 1, wherein the nitrogenous base is selected from the group consisting of primary amines, secondary amines, diamines, triamines, tetraamines, pentamines, cyclic amines, cyclic diamines, amine oligomers, polyamines, alcoholamines, guanidines, amidines, and mixtures thereof.

9. The solvent system of claim 1, wherein the nitrogenous base is selected from the group consisting of 1,4-diazabicyclo-2,2,2-octane; piperazine ("PZ"); 1,1,3,3-tetramethylguanidine ("TMG"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1,2,3-triazole; 1,2,4-triazole; and mixtures thereof.

10. The solvent system of claim 1, wherein the solvent system is immiscible with water.

\* \* \* \* \*